United States Patent
Zhao et al.

(10) Patent No.: US 6,405,267 B1
(45) Date of Patent: Jun. 11, 2002

(54) COMMAND REORDERING FOR OUT OF ORDER BUS TRANSFER

(75) Inventors: Randy X. Zhao, Fremont; Chien-Te Ho, Sunnyvale; Steve Fong, Milpitas, all of CA (US)

(73) Assignee: S3 Graphics Co., Ltd. (KY)

( * ) Notice: Subject to any disclaimer, the term of this patent is extended or adjusted under 35 U.S.C. 154(b) by 0 days.

(21) Appl. No.: 09/236,062

(22) Filed: Jan. 22, 1999

(51) Int. Cl.$^7$ .......................... G06F 13/00; G06F 13/28; G06F 13/38; G06F 9/30; G06F 12/00

(52) U.S. Cl. ..................... 710/35; 710/5; 710/20; 710/21; 710/33; 710/38; 710/39; 710/52; 710/129; 345/537; 345/511; 345/520; 345/522; 345/526; 345/538; 711/202; 711/217; 711/218; 712/206; 712/215

(58) Field of Search .................. 709/213, 215, 709/238, 239, 240, 245; 710/1, 3, 4, 5, 7, 20, 21, 29, 33, 35, 36, 38–40, 52–57, 61–64, 72, 74, 129, 244; 711/1–3, 141, 145, 147, 150, 151, 153–155, 202, 210, 218, 217, 220; 712/32, 34–36, 204–208, 214–216, 225; 345/520, 522, 537, 538, 565, 566, 567, 511, 526

(56) References Cited

U.S. PATENT DOCUMENTS

| 5,057,998 A | 10/1991 | Hirokawa | 364/200 |
| 5,230,064 A | 7/1993 | Kuo et al. | 395/162 |

(List continued on next page.)

FOREIGN PATENT DOCUMENTS

| WO | WO 97/14101 | 4/1997 |

OTHER PUBLICATIONS

"Accelerating Your Graphics—A Diamond Multimedia White Paper", Diamond Multimedia Systems, Inc., 2 pages, 1997.

"Accelerated Graphics Port Interface Specification", Intel Corporation, Rev. 2.0, pp. 79–87, May, 1998.

Datasheet, Intel 440BX AGPset: 82443BX Host Bridge/Controller, Order No. 290633–001, Intel Corporation, Apr., 1998.

Diamond Multimedia Exotic Memory Whitepaper, Diamond Multimedia Systems, Inc., 8 pages, 1997.

"Intel Platforms for Visual Computing: A White Paper on Intel's Visual Computer Initiative", Intel Corporation, 8 pages, Mar., 1997.

(List continued on next page.)

*Primary Examiner*—Jeffrey Gaffin
*Assistant Examiner*—Tanh Q Nguyen
(74) *Attorney, Agent, or Firm*—Carr & Ferrell LLP

(57) ABSTRACT

A system and method for increasing effective bus bandwidth in communicating with a graphics device. Graphics commands and associated parameters are written into a contiguous region of system memory and transmitted in a weakly ordered fashion over a bus to a graphics device. The graphics device reorders the incoming data into the same order as which the data was written into the contiguous region of system memory, thereby allowing the use of order dependent encoded commands with the weakly ordered bus interface.

16 Claims, 15 Drawing Sheets

U.S. PATENT DOCUMENTS

| | | | | |
|---|---|---|---|---|
| 5,299,309 | A | | 3/1994 | Kuo et al. .................. 395/162 |
| 5,321,836 | A | * | 6/1994 | Crawford et al. ........... 711/206 |
| 5,388,207 | A | | 2/1995 | Chia et al. .................. 395/164 |
| 5,432,912 | A | | 7/1995 | Kihara ....................... 395/275 |
| 5,561,780 | A | * | 10/1996 | Glew et al. ................. 711/126 |
| 5,612,863 | A | * | 3/1997 | De Lange ................... 364/134 |
| 5,630,075 | A | | 5/1997 | Joshi et al. ................. 395/250 |
| 5,664,148 | A | * | 9/1997 | Mulla et al. ................ 711/138 |
| 5,805,930 | A | * | 9/1998 | Rosenthal et al. ............ 710/57 |
| 5,852,451 | A | | 12/1998 | Cox et al. ................... 345/509 |
| 5,893,155 | A | * | 4/1999 | Cheriton .................... 711/144 |
| 5,905,509 | A | * | 5/1999 | Jones et al. ................. 345/520 |
| 5,920,881 | A | * | 7/1999 | Porterfield ..................... 711/2 |
| 5,945,997 | A | | 8/1999 | Zhao et al. .................. 345/430 |
| 5,964,859 | A | * | 10/1999 | Steinbach et al. .......... 710/129 |
| 6,046,752 | A | * | 4/2000 | Kirkland et al. ............ 345/505 |
| 6,073,210 | A | * | 6/2000 | Palanca et al. ............. 711/118 |
| 6,085,263 | A | * | 7/2000 | Sharma et al. ............... 710/56 |
| 6,112,262 | A | * | 8/2000 | Goettsch ..................... 710/35 |
| 6,122,715 | A | * | 9/2000 | Palanca et al. ............. 711/154 |
| 6,157,397 | A | * | 12/2000 | Bogin et al. ................ 345/511 |
| 6,173,393 | B1 | * | 1/2001 | Palanca et al. ............. 712/224 |
| 6,202,101 | B1 | * | 3/2001 | Chin et al. ..................... 710/5 |
| 6,205,520 | B1 | * | 3/2001 | Palanca et al. ............. 711/138 |
| 6,223,258 | B1 | * | 4/2001 | Palanca et al. ............. 711/138 |
| 6,247,102 | B1 | * | 6/2001 | Chin et al. .................. 711/150 |
| 6,249,853 | B1 | * | 6/2001 | Porterfield .................. 711/206 |
| 6,272,600 | B1 | * | 8/2001 | Talbot et al. ............... 711/140 |
| 6,275,243 | B1 | * | 8/2001 | Priem et al. ................ 345/568 |
| 6,286,090 | B1 | * | 9/2001 | Steely, Jr. et al. .......... 711/207 |
| 6,300,953 | B1 | * | 10/2001 | Rivard et al. ............... 345/430 |
| 6,313,845 | B1 | * | 11/2001 | Terry et al. ................. 345/537 |
| 6,314,500 | B1 | * | 11/2001 | Rose ........................... 711/148 |
| 6,329,985 | B1 | * | 12/2001 | Tamer et al. ............... 345/356 |

OTHER PUBLICATIONS

S3's Savage3D Accelerator: A Comprehensive Architecture for Superior PC Video, Savage3D.white papers, 9 pages, S3 Incorporated, 1998.

The Accelerated Graphics Port (AGP)—A Diamond Multimedia White Paper, Diamond Multimedia Systems, Inc., 2 pages, 1997.

"Write Combining Memory Implementation Guidelines", Intel Corporation, 17 pgs., Nov. 1998.

* cited by examiner

COMMAND REORDERING FOR OUT OF ORDER BUS TRANSFER

BACKGROUND OF THE INVENTION

The present invention relates generally to graphics display systems and methods, and in particular to methods and systems for interfacing a graphics system with a weakly ordered bus interface.

In many modern computer or computerized systems the primary interface for providing information to a user is a display. Information generated by the computer system's processing unit is conveyed to the user by means of the display. As computer systems have evolved and become ever more capable, increased emphasis has been placed on the quality of the images displayed, including both the quantity of data displayed and the rate at which data on the display may change in order to increase the quality of the images displayed without overburdening the computer system's processing unit, graphics devices, such as graphics accelerators, are often used to perform much of the work required to render a given image.

In general, the processing unit, or CPU, determines what graphical images should be displayed on a display. The graphics device, on the other hand, largely determines how to display the image. The CPU executes, or runs, a software program such as a driver. The driver creates drawing commands to be provided to the graphics device. An example of a command is a command to draw a triangle. Along with the drawing command, the driver provides information, i.e. parameters, that pertains to the command. For example, the parameters associated with the command to draw a triangle could be the vertices of the triangle, and the red, green, blue and intensity values of the triangle. The graphics device then renders the display by manipulating the drawing command and parameters to produce a visual representation, such as a rendered triangle, on the display.

As visual representations have become more realistic, the drawing commands and parameters have become more complex. For example, the drawing command for rendering a three-dimensional triangle requires numerous parameters for designating three-dimensional spatial locations for each vertex, as well as additional shading or texturing information. The large number of required parameters for commands, and the rate at which commands must be propagated from the CPU to the graphics device, place ever increasing demands on the CPU, the graphics device, and also the communication interface between the CPU and the graphics device.

The CPU generally communicates with the graphics device over a bus. In the past, and in many existing systems, the CPU and graphics device communicated over a general system bus. Due to the high volume of information required to produce high quality images, particularly dynamic texturing three dimensional images, use of the general system bus inordinately taxes system resources and, at times, provides insufficient support of data requirements for graphics displays. Accordingly, a dedicated CPU to graphics device bus is provided by some systems. A dedicated CPU to graph as device bus reduces the number of devices competing for the use of the bus and thereby provides more bandwidth or space on the bus for transferring information to the graphics device. The dedicated bus, however, does not reduce the large amount of information required to be communicated to the graphics device. Therefore, with the tremendous amount of information being communicated to the graphics device, the importance of efficient bus utilization becomes even greater.

One way to reduce the amount of data transferred from the CPU to the graphics device is to efficiently encode the command to indicate the meaning of parameters pertaining to the command. This effectively increases bus bandwidth as less than the complete set of possible parameters need be sent from the CPU to the graphics device every time the CPU issues a new command. Instead, the graphics device determines from the command the meaning of parameters provided with the command. This implies, however, that the parameters bear some predefined relationship to the command. An example of such a relationship is that the parameters be received by the graphics device in a predefined sequential order after receipt of a command.

Use of write combining (WC) technology is another way to increase bus bandwidth. An example of WC technology is found in the Intel AGP chipset 440 BX. Write combining combines individual writes to a bus into an aggregation, with each aggregation being formed of many individual writes. The order of the individual writes, however, is not necessarily maintained.

Thus, if the bus is transmitting information sequentially loaded into an area in memory, the order in which the information is received may not be the order in which it was sequentially loaded into memory. In other words, when using WC the CPU or the bus controller does not necessarily transfer information in the same order as the information is prepared by software executing on the CPU, such as the graphics driver. Instead the CPU or bus controller may transmit information as it sees fit to increase bus efficiency.

The use of both WC technology and encoded commands to increase bus bandwidth is therefore problematical. WC technology requires that at times information be transmitted in an order possibly different than that otherwise expected by the sender. The use of encoded commands, on the other hand, requires that received parameters be in a predefined order with respect to a command. Accordingly, methods and systems which overcome the obstacles of using of both write combining technology and encoded commands are desirable.

SUMMARY OF THE INVENTION

The present invention provides systems and methods of increasing effective bus bandwidth through utilization of commanding encoding in a weakly ordered bus interface. According to the present invention, items of data are written sequentially into sequential ordered areas of a memory. The ordered areas of memory thereby form command registers, with the registers being identifiable by address locations. Thus, each item of data is placed in an area of the memory having an associated address. The items of data and their associated addresses are transmitted over a bus. The items of data and the associated addresses are received from the bus, and the addresses for each item of data are examined. The items of data are then placed in a storing buffer based on the address associated with each item. The placement of the items in the storing buffer is accomplished in the same order as the items of data were originally written to the sequentially ordered areas of the memory.

The items of data comprise commands and parameters, with each parameter, and generally multiple parameters, pertaining to a command. The method further comprises examining the items of data to determine whether the items of data are commands or parameters, as well as determining which parameters pertain to which command. The storing buffer may comprise a plurality of storage buffers. Each of the storage buffers has two arrays associated with the storage buffer. The first array is a read availability status array. The read availability status array indicates whether locations in the storage buffer contain data available for reading. The second array is a direct read status array. The direct read status array indicates for each storage location within the storage buffer whether data has been directly read out to a command interpreter, which may be a burst command interface. The direct read status array is useful in that the storage buffers may be read out in bulk to a temporary storage facility, which may include a graphics device memory, in order to avoid overflowing the command storage buffers as well as to increase system efficiency. However, there may be times when less than all of the command storage buffers have data available for reading, but a sum of the storage buffer data should be read. Thus data also needs to be provided directly to the command interface, instead of only after being stored in the temporary memory. If data is read directly to the burst command interface, however, then the corresponding slots and the other storage buffers should also be provided directly to the command interpreter.

In one embodiment, data received over the bus is split into a data portion and an address portion, and routed to a FIFO. The data portion is routed to the FIFO via multiplexors using portions of the address associated with the data to determine the portion of the FIFO in which the data should be placed. The FIFO serves as an elastic memory such that data may be clocked into the FIFO at a bus clock rate, and clocked out of the FIFO at graphics device cock rate. After data is output from the FIFO the data is once again multiplexed, or routed using a router, into a slot in the storage buffers, the slot selected based on portions of the address information associated with the data item. The data in the storage buffers is then provided to a command interpreter for further processing by the graphics device.

Many of the attendant features of this invention will be more readily appreciated as the same becomes better understood by reference to the following detailed description considered in connection with the accompanying drawings.

DETAILED DESCRIPTION

Figure 1:
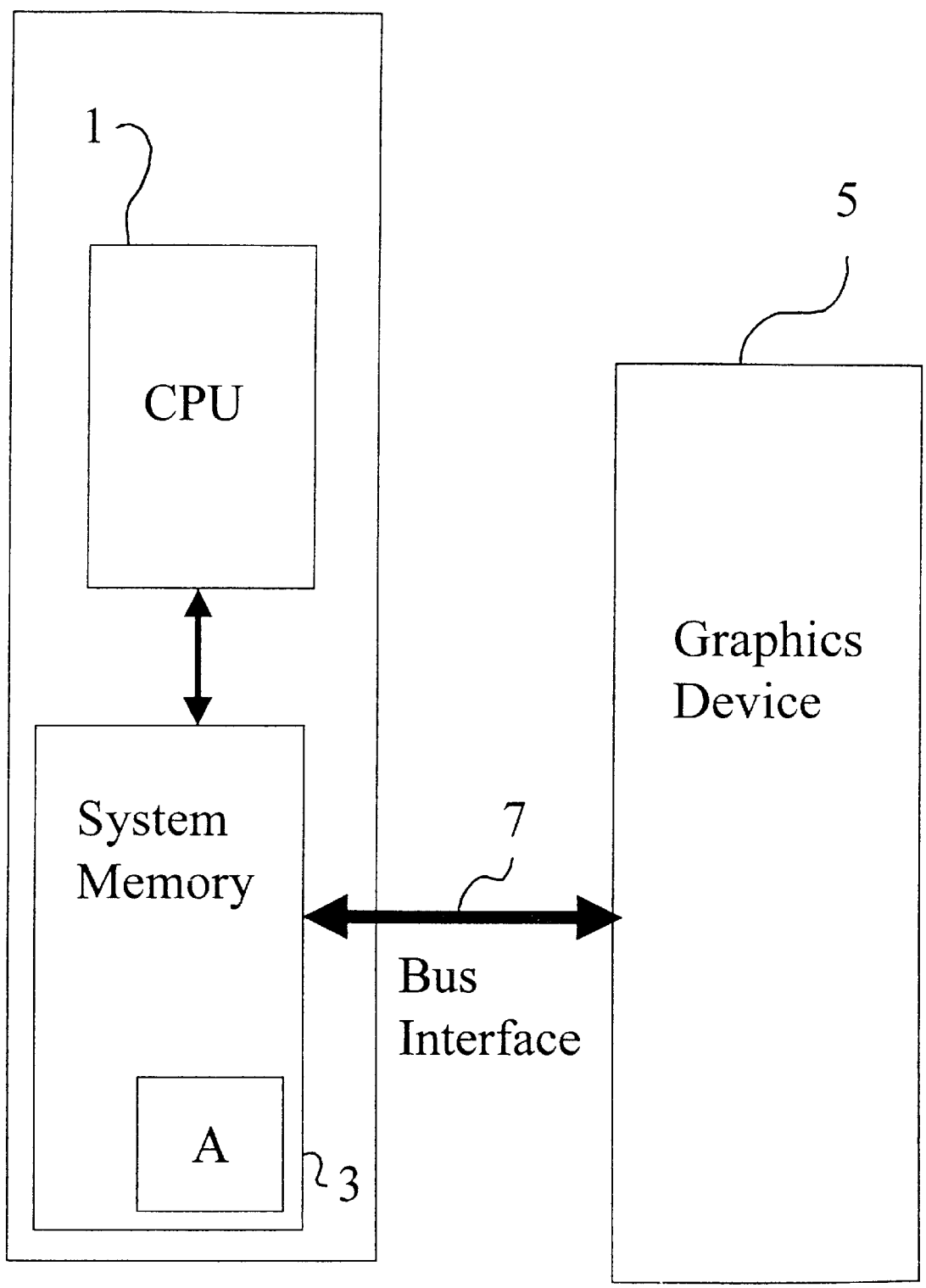
FIG. 1 illustrates a block diagram of a computer system using the present invention.

The present invention provides a system and a method of increasing effective bus bandwidth utilization by reordering out of order data received from a weakly ordered bus interface. FIG. 1 illustrates a computer system using the present invention. The computer system includes a CPU 1 which communicates with a graphics device over a bus 7. A graphics driver program runs on the CPU. The graphics driver creates drawing commands and parameters utilized in conjunction with the drawing commands. The driver arranges the drawing commands and parameters into 32 bit registers. These 32 bit registers are reserved regions of physical memory address space, and in the embodiment of FIG. 1 are a contiguous region A of system memory 3 or are sequentially ordered areas of memory identifiable by address. In the embodiment of FIG. 1 the contiguous region A is defined as a write combining memory type. Further, the graphics driver sequentially writes commands and parameters into sequentially increasing address locations of the memory, until an upper bound is reached. Once the upper bound is reached, the graphics driver begins writing data, i.e., commands and parameters, starting at the lower bound when a command is ready to be written. Using the bus, the commands and parameters are communicated to the graphics device 5, which often includes a co-processor.

Figure 2:
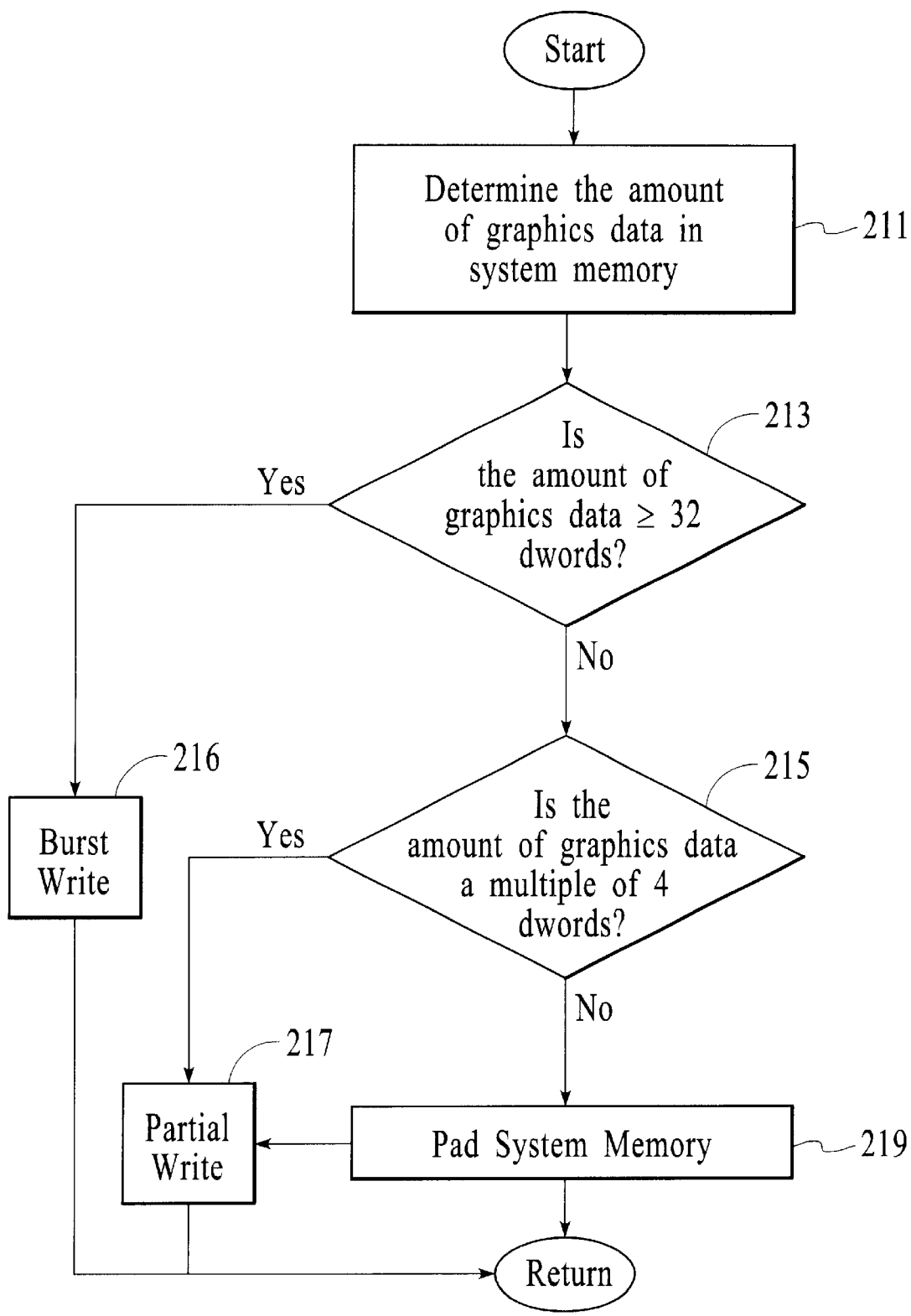
FIG. 2 illustrates a flow diagram of a process for placing data in a contiguous memory and sending the data drawing command and parameters ultimately to a graphics device.

FIG. 2 illustrates a flow diagram of a process to send a drawing command and parameters ultimately to the graphics device. In step 211, the process checks the amount of graphics data, drawing commands and parameters, in the system memory. In step 213 the process checks if the amount of graphics data in the system memory is greater than or equal to 32 DWord. If the amount of graphics data in the system memory is greater than or equal to 32 DWord, then, in step 216, the process sends the graphics data to the graphics device in a burst write transaction. A burst write transaction is when all 32 DWord are transmitted over the bus interface in four bus clocks. Further burst write transactions will result until all the graphics data are transmitted on the bus interface. If the amount of graphics data in the system memory is less than 32 DWord, the process in step 215 checks if the amount of graphics data is a multiple of 4 DWords. If the amount of graphics data is a multiple of 4 DWords, the process, in step 217, sends the data to the graphics device in a partial write transaction. A partial write transaction is when 1 Dword is transmitted on the bus interface in one bus clock. However, if the amount of graphics data is not a multiple of 4 DWords, the process in step 219 adds dummy or filler data into the system memory up to an amount such that the graphics data is a multiple of 4 DWords. In step 217, the process sends the graphics data, along with the filler data to the graphics device by executing partial write transactions and then the process returns.

Figure 3:
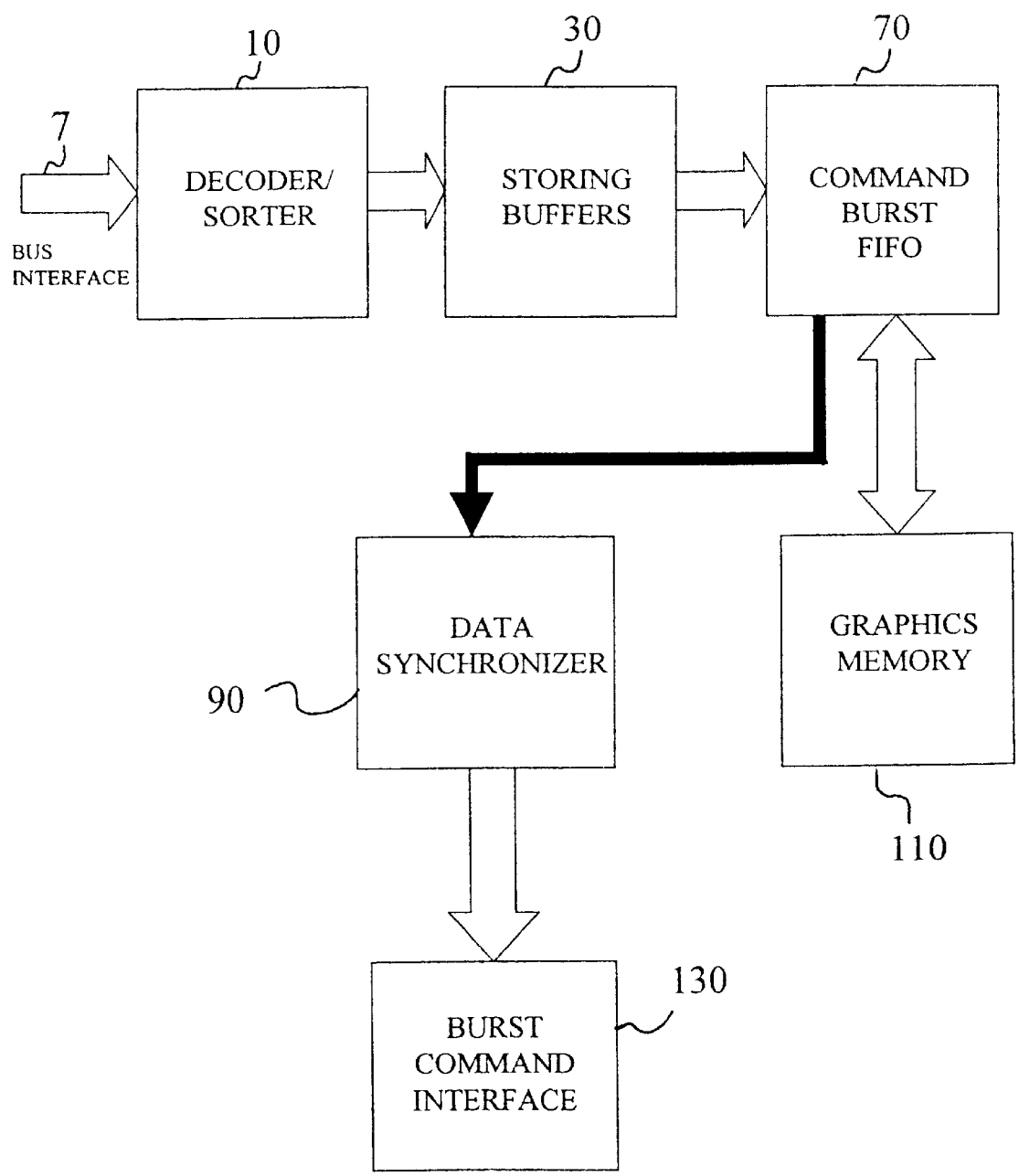
FIG. 3 illustrates a block diagram of an embodiment of the graphics device of FIG. 1.

FIG. 3 illustrates a block diagram of an overview of a receiving portion of the graphics device of FIG. 1. A bus interface 7, such as an accelerated graphics port (AGP) interface or a peripherals controller interface (PCI), is connected to a decoder/sorter 10. The bus interface provides a conduit for providing data, commands and parameters, from the CPU (shown in FIG. 1, to the graphics device. A detailed description of the AGP interface, is described in Accelerated Graphics Part Interface Specification, May 4, 1998, the disclosure of which is incorporated herein by reference. Further description concerning the bus interface, write combining, and connection to peripherals such as a graphics device is described in Intel 440 BX AGPset: 82443BX Host Bridge/Controller, April 1998, and Write Combining Memory Implementation Guidelines, November 1998, the disclosures of which are incorporated herein by reference.

The decoder/sorter synchronizes the data to the graphics device's clock. The decoder/sorter 10 also determines the order in which the data was written by the graphics driver executing on the CPU. The decoder/sorter determines this order by decoding the addresses of the received data and storing the data in storing buffers 30 based on the decoded addresses. The storing buffers are read by a command burst FIFO 70 or a data synchronizer 90. The command burst FIFO 70 sends data to the data synchronizer 90 and sends 128 bit packed data to a graphics memory 110. Graphics data in the graphics memory 110 is also sent to the data synchronizer 90 in a 128 bit packed data stream. Both the graphics memory and the command burst FIFO are temporary storage areas. The data synchronizer 90 selects the appropriate data source, the storing buffers 30, the command burst FIFO 70, or the graphics memory 110, and sends the graphics data to a burst command interface 130. The burst command interface 130 recognizes the commands and parameters in the received data and accordingly provides appropriate information to other portions of the graphics device. The burst command interface, which is in part a command interpreter, examines the data for a pre-defined bit pattern in order to identify a command versus a parameter. Once the burst command interface has identified a command, the burst command interface determines which other portions of the graphics device to which to send commands, the appropriate parameters and other instructions. In other words, the commands are identifiable by bit patterns in the received data, and the commands are pre-enumerated such that the command interpreter can determine the parameters which pertain to the command.

Figure 4:
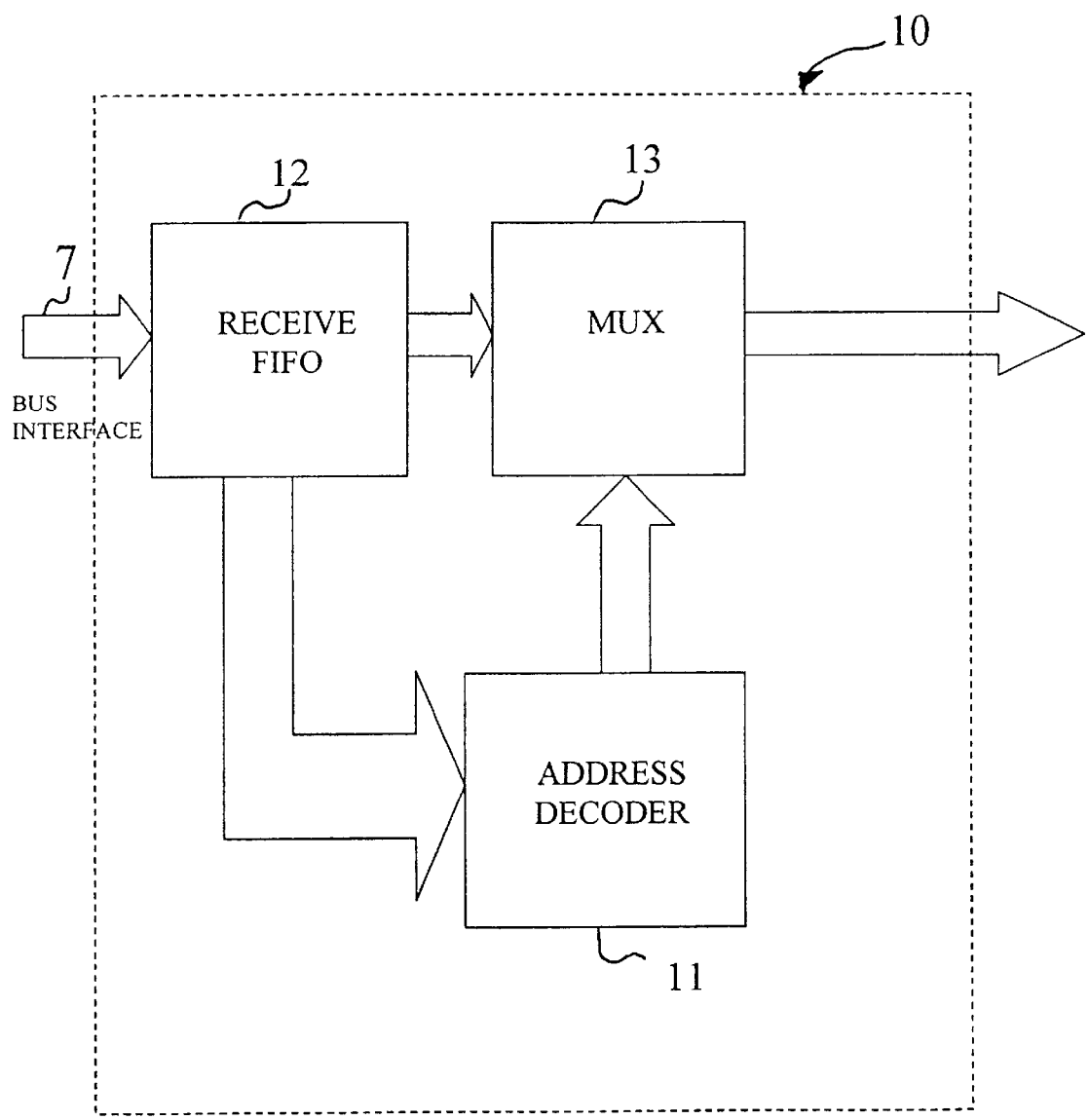
FIG. 4 illustrates a block diagram of an embodiment of the decoder/sorter of FIG. 3.

FIG. 4 illustrates a block diagram of an embodiment of the decoder/sorter 10 of FIG. 3. Data is transmitted over the bus interface to a receive FIFO 12. The bus interface may operate at a different frequency, such as 33 MHz or 66 MHz, than the circuitry on the graphics device. Accordingly, the receive FIFO elastically spans the frequency difference between the bus interface and the graphics device and thereby acts as a data queue. The receive FIFO is 128 bits deep. If 128 bits of data are transferred on the bus interface in one bus clock, one bus clock fills one entry of the receive FIFO. If only 32 bits of data are received in one bus clock, the data is padded with 96 bits of filler data so that one bus clock fills one entry of the receive FIFO. When one entry on the receive FIFO is full, the data is transferred to the storing buffers. By regulating the flow of data from the bus interface to the storage buffers, the receive FIFO synchronizes the frequency of the bus interface with the operational frequency of the graphics device.

The receive FIFO 12 is connected to an address decoder 11 and a MUX 13. The address decoder 11 decodes the address portion of the receive data to determine an address location and sends the address location to the MUX 13. The MUX 13 receives a data portion, which is 32 bits of graphics data, transferred from the bus interface 7 and also receives as a selector the address location from the address decoder 11, and the MUX a uses the selector to place the graphics data within the storing buffers 30.

Figure 5:
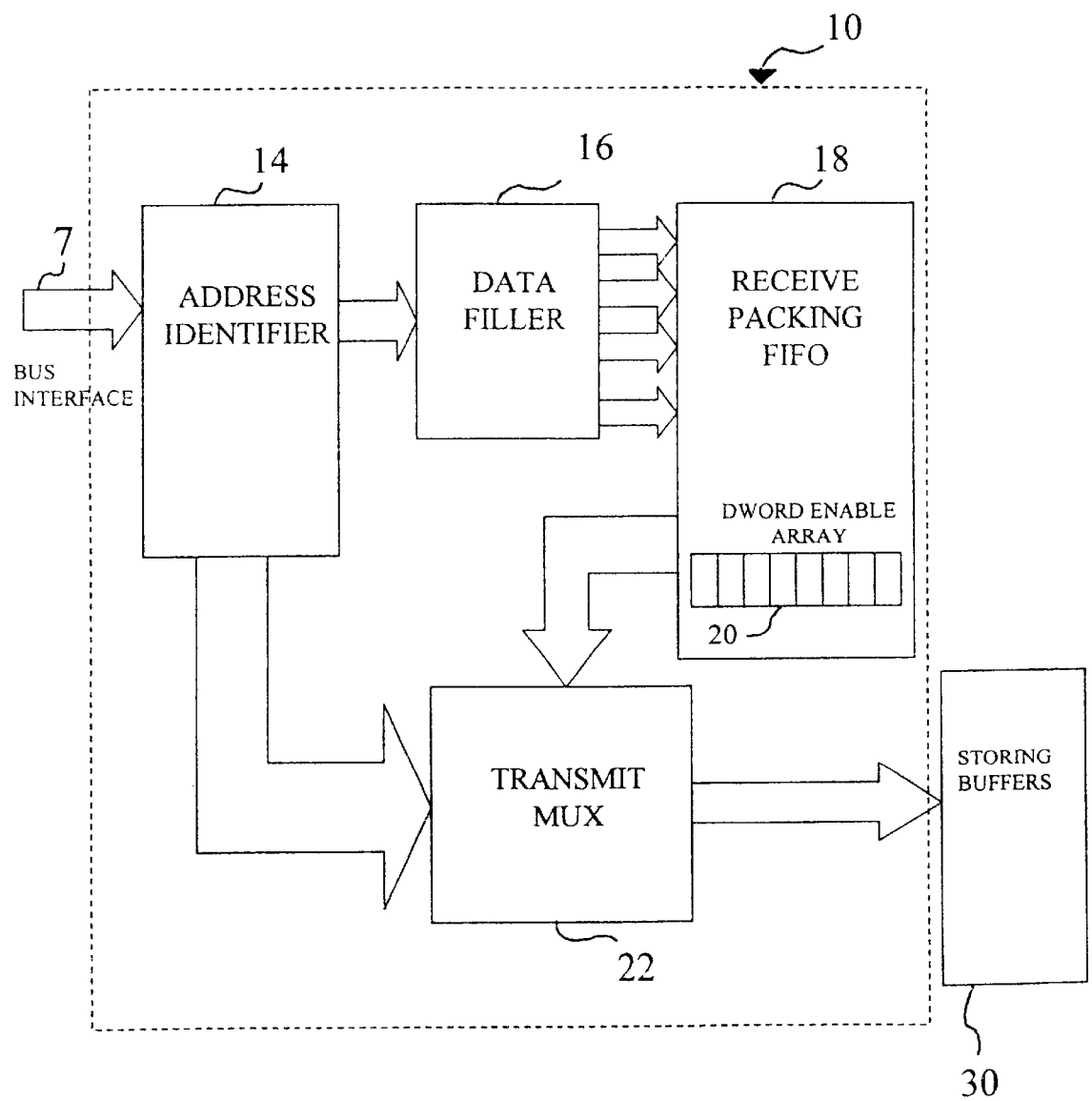
FIG. 5 illustrates a block diagram of another embodiment of the decoder/sorter of FIG.3.

FIG. 5 illustrates a block diagram of another embodiment of the decoder/sorter 10. An address identifier 14 receives information from a bus interface, and provides the information to a data filler 16 and an address portion to transmit MUX 22. the data filler 16 sends 128 packed bits of data to a receive packing FIFO 18. The receive packing FIFO 18 sends 128 bits of data to a transmit MUX 22. The receive packing FIFO 18 stores 8 entries, each entry able to store 128 bits of data. Within each of the 8 entries, there are 4 sections of 32 bits. As previously described, 32 bits of data are sometimes transferred over the bus interface in one bus clock. Those 32 bits of data are stored in one section of one entry within the receive packing FIFO 18. The data filler 16 determines from the address portion of the information which section within the receive packing FIFO will store the 32 bits of data. The other 96 bits, out of the 128 bits, of the one entry of the receive packing FIFO are filled by the data filler 16 with dummy data, such as all zeros.

A DWord enable array 20 is associated with each entry within the receive packing FIFO 38. The DWord enable array 20 contains a DWord enable bit associated with each section within the respective entry. The DWord enable bit informs the storing buffers, that ultimately receive the data, which section contains the 32 bits of valid data. Hence, the storing buffers will only store the 32 bits of valid data and not store the 96 bits of dummy data.

The transmit MUX 22, using the decoded address portion provided by the address identifier 14 as a selector, the transmit MUX provides the valid data from the receive packing FIFO 18 to as a selector storing buffers 30.

In another embodiment of the decoder/sorter 10, 128 bits of data are transferred on the bus interface in one bus clock. An address portion is sent with each 32 bits of data. Hence, for the 128 bits of data transferred, four sets of 32 bits of data are included with, respectively, four separate address portions. Each address portion determines which section within the receive packing FIFO to store the 32 bits of data.

In another embodiment of the present invention, 64 bits of data are transferred on the bus interface in one bus clock and in another embodiment of the present invention 96 bits of data may be transferred on the bus interface in one bus clock. Each address portion designates which section within the receive packing FIFO to store the 32 bits of data. Sections of an entry not designated Lo store data are filled with dummy data.

Figure 6:
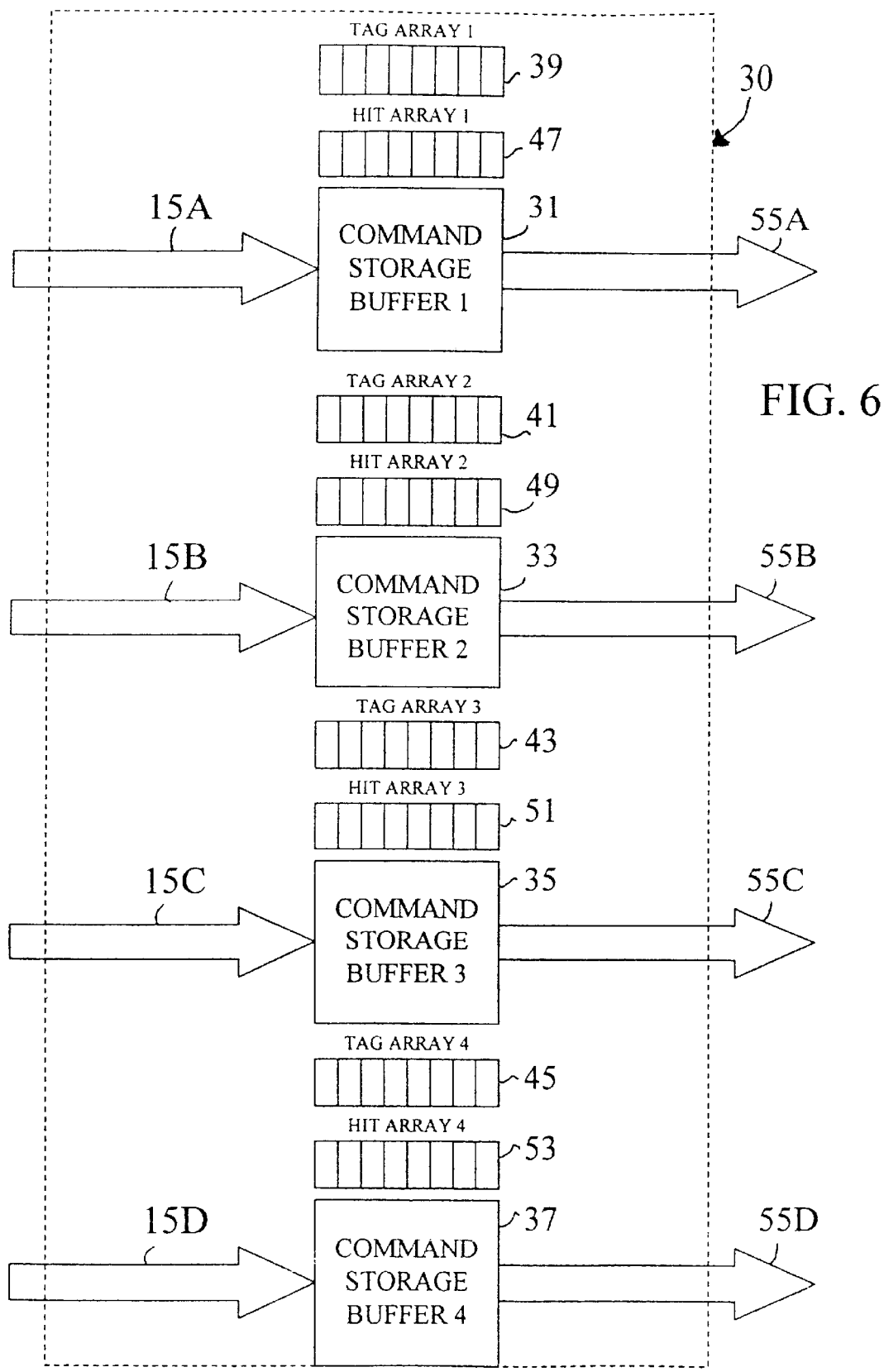
FIG. 6 illustrates a block diagram of an embodiment of the storing buffers of FIG. 3.

FIG. 6 illustrates a block diagram of a detailed view of the storage buffers 30 of FIG. 3. Data streams 15A, 15B, 15C, and 15D are inputs into the storing buffers 30. The data streams 15A, 15B, 15C, and 15D are connected, respectively, to command storage buffers 31, 33, 35, and 37. Each of the command storage buffers 31, 33, 35, and 37 are 8×32 buffers able to hold 256 bits of data. Each command storage buffer has an associated 8×1 tag array, a read availability array, and an 8×1 hit array, a direct read status array. Thus, command storage buffers 31, 33, 35 and 37 have, respectively, tag arrays 39, 41, 43, 45 and hit arrays 47, 49, 51 and 53. Each bit, a read availability indicator, of the tag array and each bit, a direct read status indicator, of the hit array, are associated with one of the 32 bit words in the command storage buffers. Each command storage buffer 31, 33, 35, and 37 is connected, respectively, to an output data stream 55A, 55B, 55C, and 55D whereby graphics data is transmitted to either the command burst FIFO 70 or the data synchronizer 90.

Figure 7:
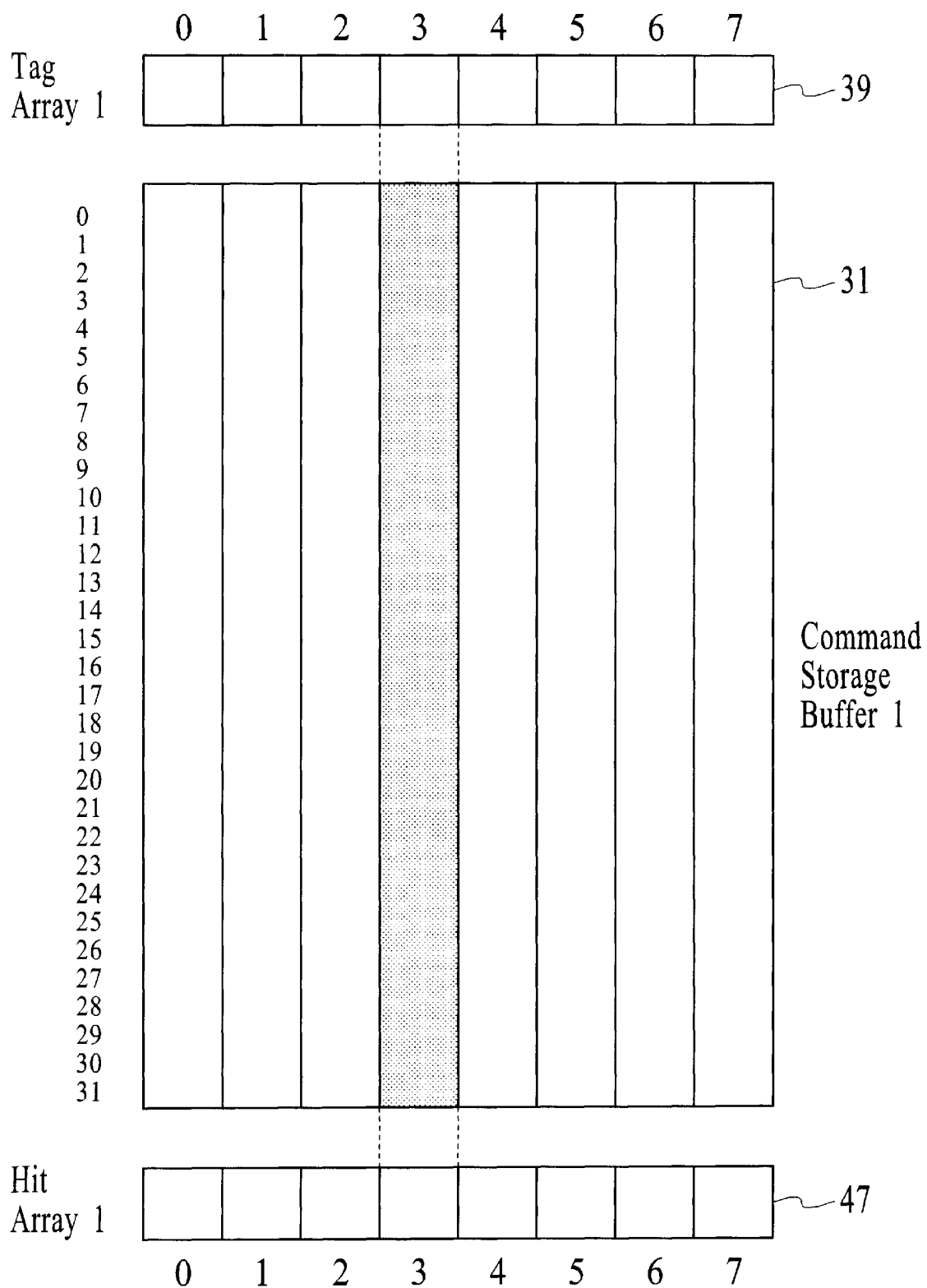
FIG. 7 illustrates an exploded view of a tag array and a hit array showing the relationship of each to a command storage buffer.

FIG. 7 illustrates an exploded view of one of the tag arrays 39 and its relationship to its respective command storage 2C buffer 31. The remaining tag arrays are the same as tag array 39, and each of these tag arrays bear the same relationship to their respective command storage buffers.

Each tag array is able to hold 8 bits of information. In other words, each tag array has 8 tag bits. Each command storage buffer contains 8 entries of 32 bits. Each of the 8 tag bits is associated with one of the 8 entries in the command storage buffer. For example, the first tag bit in the first tag array is associated with the first entry of the first command storage buffer, and the last tag bit in the first tag array is associated with the last entry of the first command storage buffer.

Each tag bit signifies whether an entry in the command storage buffer contains valid data. If a tag bit is set then the associated entry contains valid data, and no additional data should be written into that entry until the valid data has been read conversely, if a tag bit is not set then additional data can be written into the associated entry in the command storage buffer.

FIG. 7 also illustrates an exploded view of one of the hit arrays 47 and its relationship to its respective command storage buffer 31 of the storing buffers 30. The remaining hit arrays are the same as hit array 47, and each of these hit arrays bear the same relationship to their respective command storage buffers.

Each hit array holds 8 bits of information, or in other words has 8 hit bits. Each of the 8 hit bits are associated with one of the 8 entries in a command storage buffer. For instance, the third hit bit in the second hit array is associated with the third entry of the second command storage buffer. Each hit bit is used to regulate the flow of graphics data from the storage buffers 30 to the command burst FIFO 70 and the flow of graphics data from the storage buffers to the data synchronizer 90. The detailed operation and relationship of the hit bits to the storage buffers s more fully described in conjunction with FIG. 11.

Figure 8:
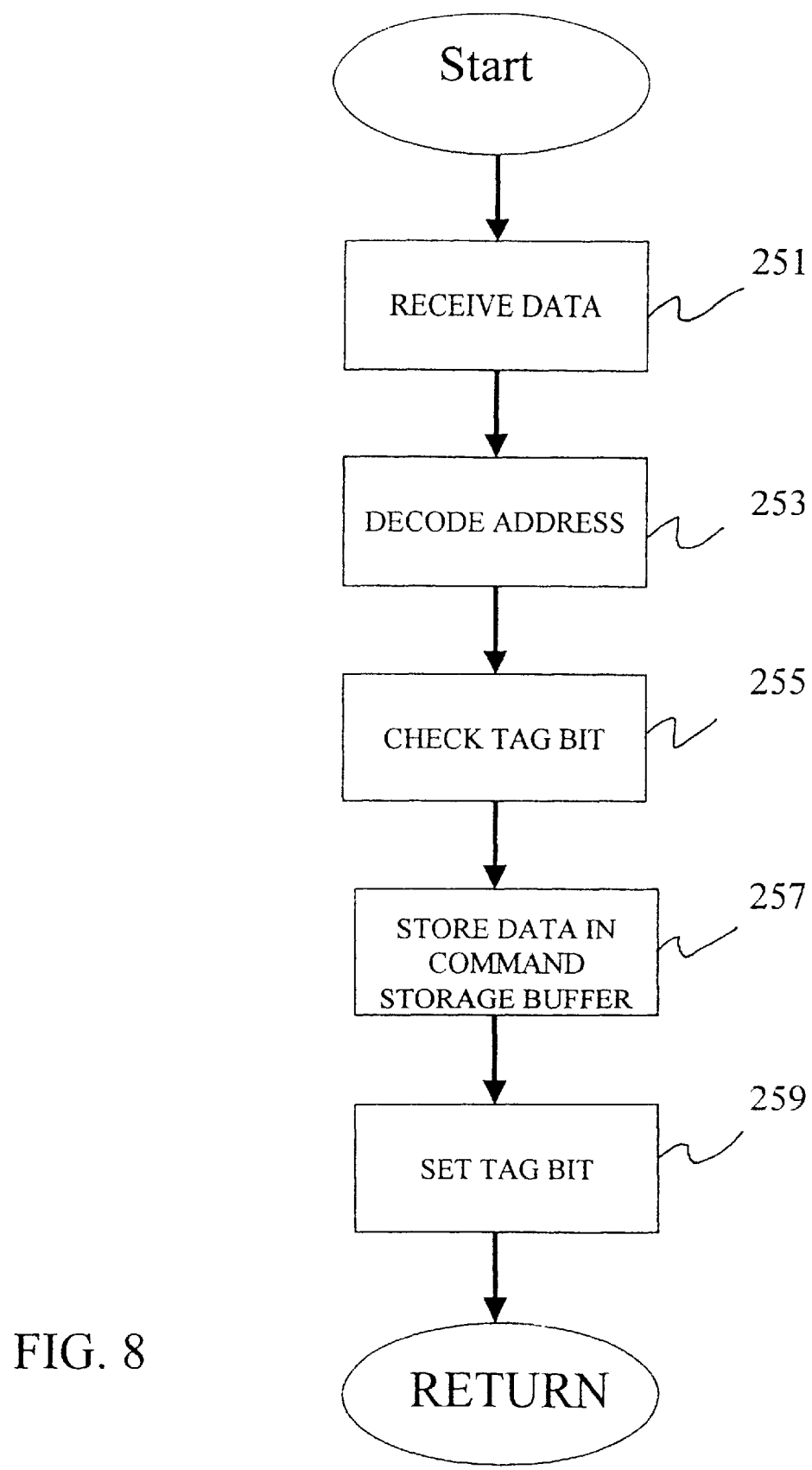
FIG. 8 illustrates a flow diagram of a process of decoding and sorting received data performed by the decoder/sorter 10 of FIG. 3.

FIG. 8 illustrates a flow diagram of a process performed by the decoder/sorter 10 of FIG. 3. In step 251, the process receives the graphics data from the bus interface. In step 253, the process decodes the address information from the data received in step 251. Using the decoded address information, the process determines which command storage buffer to use to store the received data. Further, the process uses the decoded address to determine which individual entry within the command storage buffer to use to store the received data.

In the address portion transmitted to the address decoder, bits 6 and 5 determine which one of the four command storage buffers will be used to store the graphics data. For instance, if bits 6 and 5 are both zero, command storage buffer 31 will be used to store the graphics data. Furthermore, bits 4 through 2 in the address portion determine which one of the eight entries in the command storage buffer will store the graphics data. In other words, if command storage buffer 31 is identified by bits 6 and 5 and bits 4 though 2 are zero, then the first entry in the command storage buffer 31 is used to store the graphics data.

Once the process has determined which command storage buffer and which individual entry within the command storage buffer is to be used for storing the received data, the associated tag array is checked by the process in step 255. If the associated tag bit is not set, then the process in step 257 will store the received data in the command storage buffer. In step 259, the process sets the appropriate tag bit in the associated tag array, thereby preventing the received data stored in the associated command storage buffer from being overwritten and then the process ends. If the associated tag bit is set, then the process waits, periodically checking the tag bit, until the associated tag bit is not set before storing the data into the associated command storage buffer in step 257. The process thereafter returns.

Figure 9:
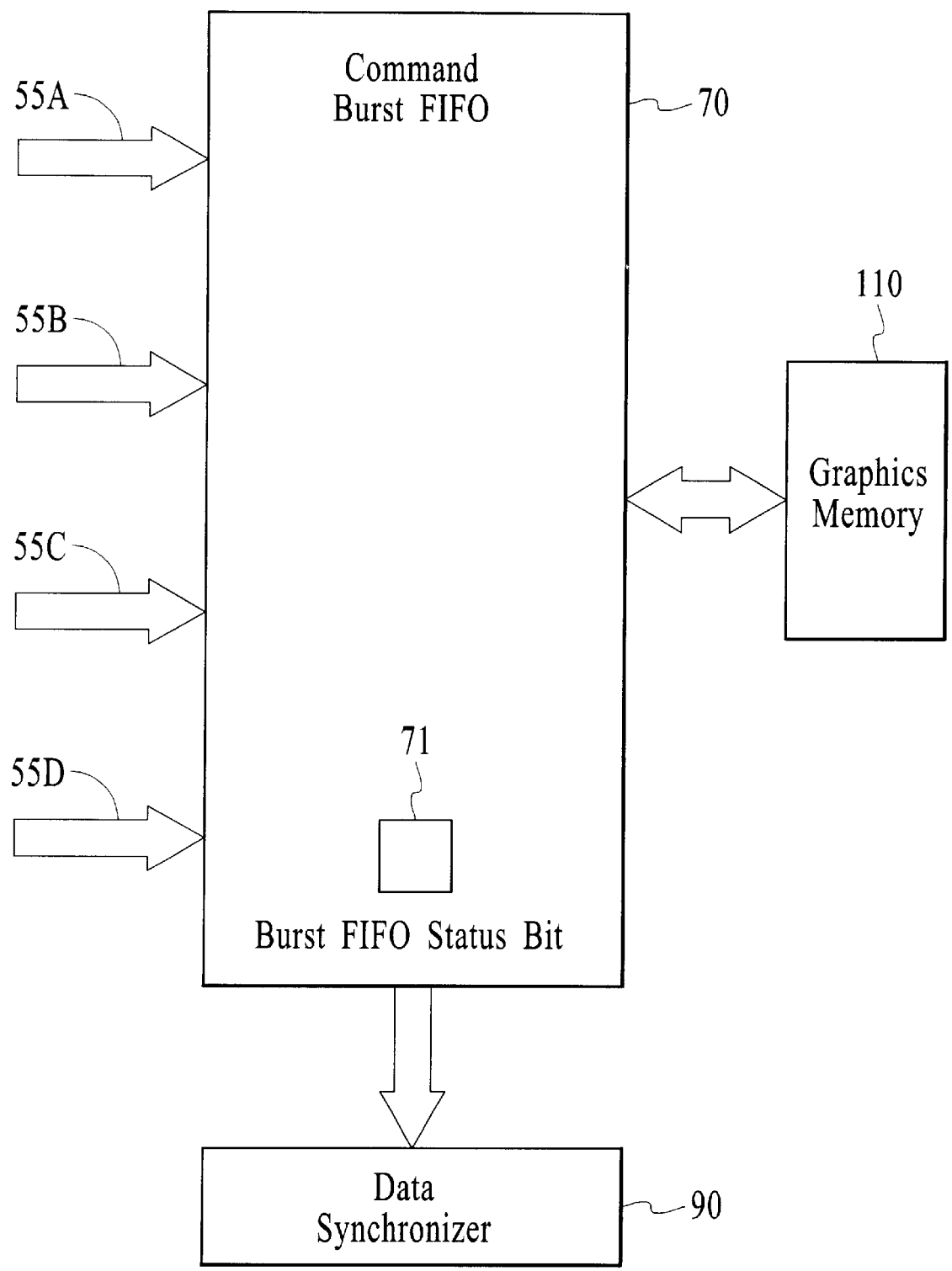
FIG. 9 illustrates a block diagram of an embodiment of the command burst FIFO of FIG. 3.

FIG. 9 illustrates a block diagram of an embodiment of the command burst FIFO 70. The command burst FIFO 70 is connected to data streams 55A, 55B, 55C, and 55D from the storing buffers 30. The command burst FIFO is also connected to the graphics memory 110 and to the data synchronizer 90. The command burst FIFO further contains a burst FIFO status bit 71. The data synchronizer 90 polls or periodically watches the burst FIFO status bit 71 to determine if the graphics data within the command burst FIFO 70 should be sent to the burst command interface. The burst FIFO status bit 71, if set, indicates that the command burst FIFO contains graphics data. If the burst FIFO status bit 71 is not set, the command burst FIFO is empty.

Figure 10:
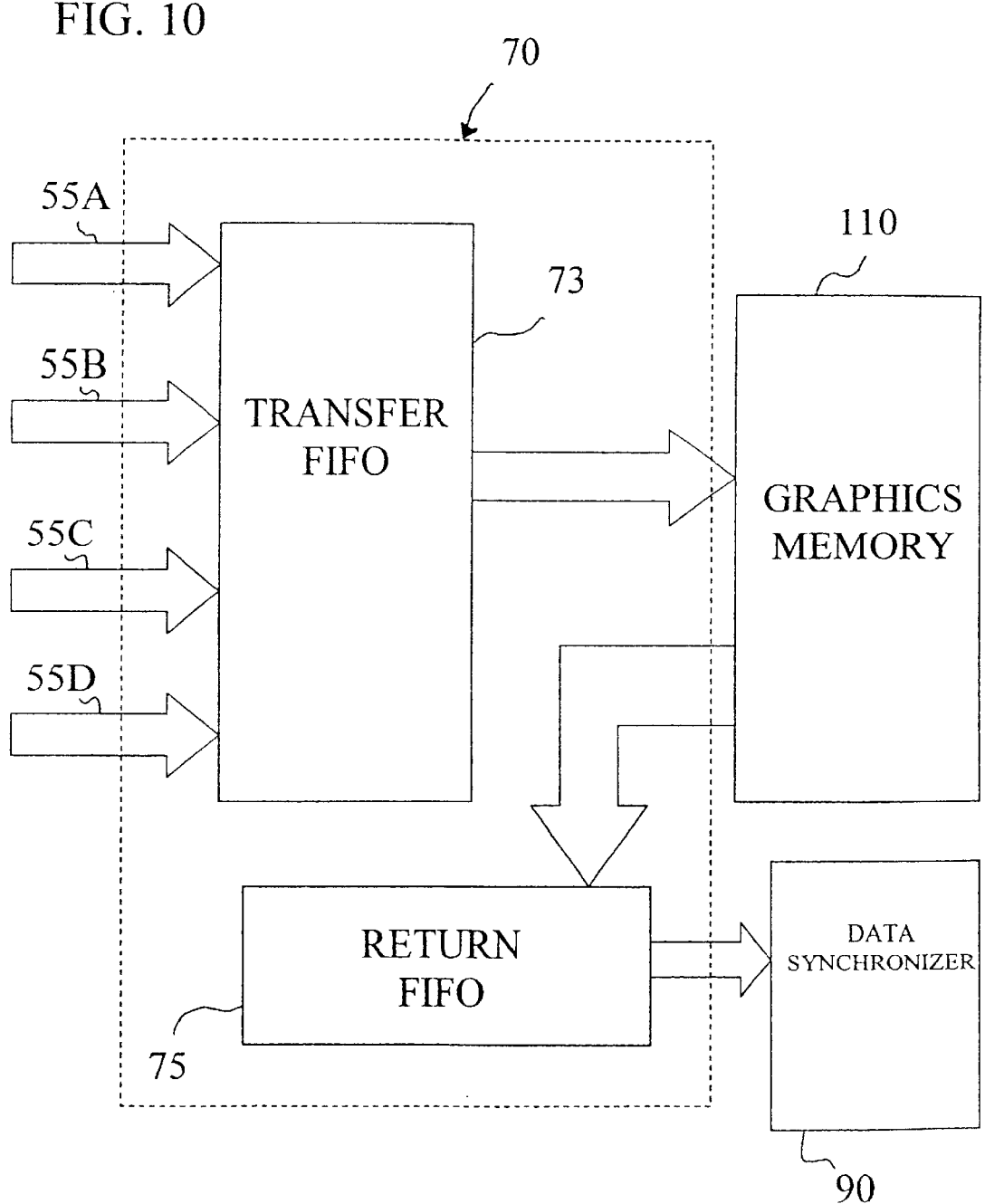
FIG. 10 illustrates a block diagram of another embodiment of the command burst FIFO of FIG. 3.

FIG. 10 illustrates a block diagram of another embodiment of the command burst FIFO 70. In the embodiment of FIG. 10, a 16×128 transfer FIFO 73 is contained in the command burst FIFO 70. The transfer FIFO 73 synchronizes the operational frequency of the command burst FIFO 70 to the operational frequency of the graphics memory. Data sent from the storing buffers is stored into the transfer FIFO. As the transfer FIFO fills up, data within the transfer FIFO is transmitted to the graphics memory 110. A 16×128 return FIFO 75 is further contained in the command burst FIFO 70. Data sent from the graphics memory 110 is stored into the return FIFO 75 to be eventually sent to the data synchronizer 90. Similarly, like the transfer FIFO 73, the return FIFO 75 synchronizes the operational frequency of the graphics memory to the operational frequency of the command burst FIFO. The data within the return FIFO 75 is eventually retrieved by the data synchronizer.

Figure 11:
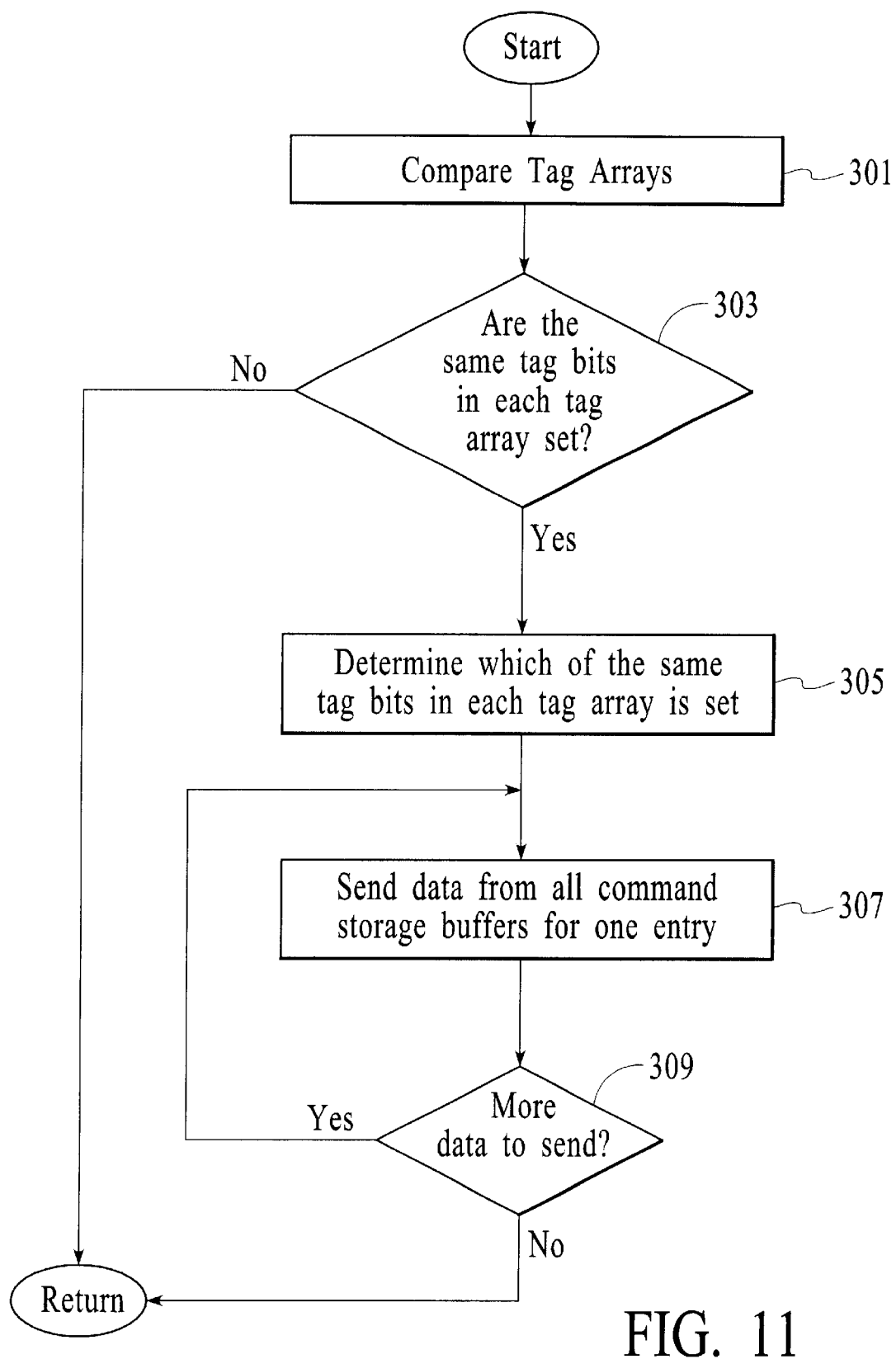
FIG. 11 illustrates a flow diagram of a process of transferring data to the command burst FIFO from the command storage buffers.

FIG. 11 illustrates a flow diagram of a process in which graphics data from the storage buffers 30 is transferred to the command burst FIFO 70. In step 301, the process examines the tag arrays. In step 303, the process determines if the same tag bits in each of the tag arrays are set. If none of the same tag bits in each of the tag arrays are set, then the process returns. However, if the process determines that one or more of the same tag bits in each of the tag arrays are set then in step 305, the process identifies which of the same bits in each of the tag arrays are set. In step 307, the process sends graphics data from all of the four command storage buffers occupying the same entry within each of the command storage buffers to the command burst FIFO. For instance, if the tag bit for the fourth entry is set in all four tag arrays, then the data in the fourth entry of all the command storage buffers are transferred to the command burst FIFO. In step 309, the process checks for additional graphics data to be sent to the command burst FIFO from the command storage buffers. If no additional graphics data is ready to be sent to the command burst FIFO, the process returns. However, if additional data is available to send to the command burst FIFO, the process repeats steps 307 and 309 until there is no additional graphics data to be sent to the command burst FIFO. The process thereafter returns.

Figure 12:
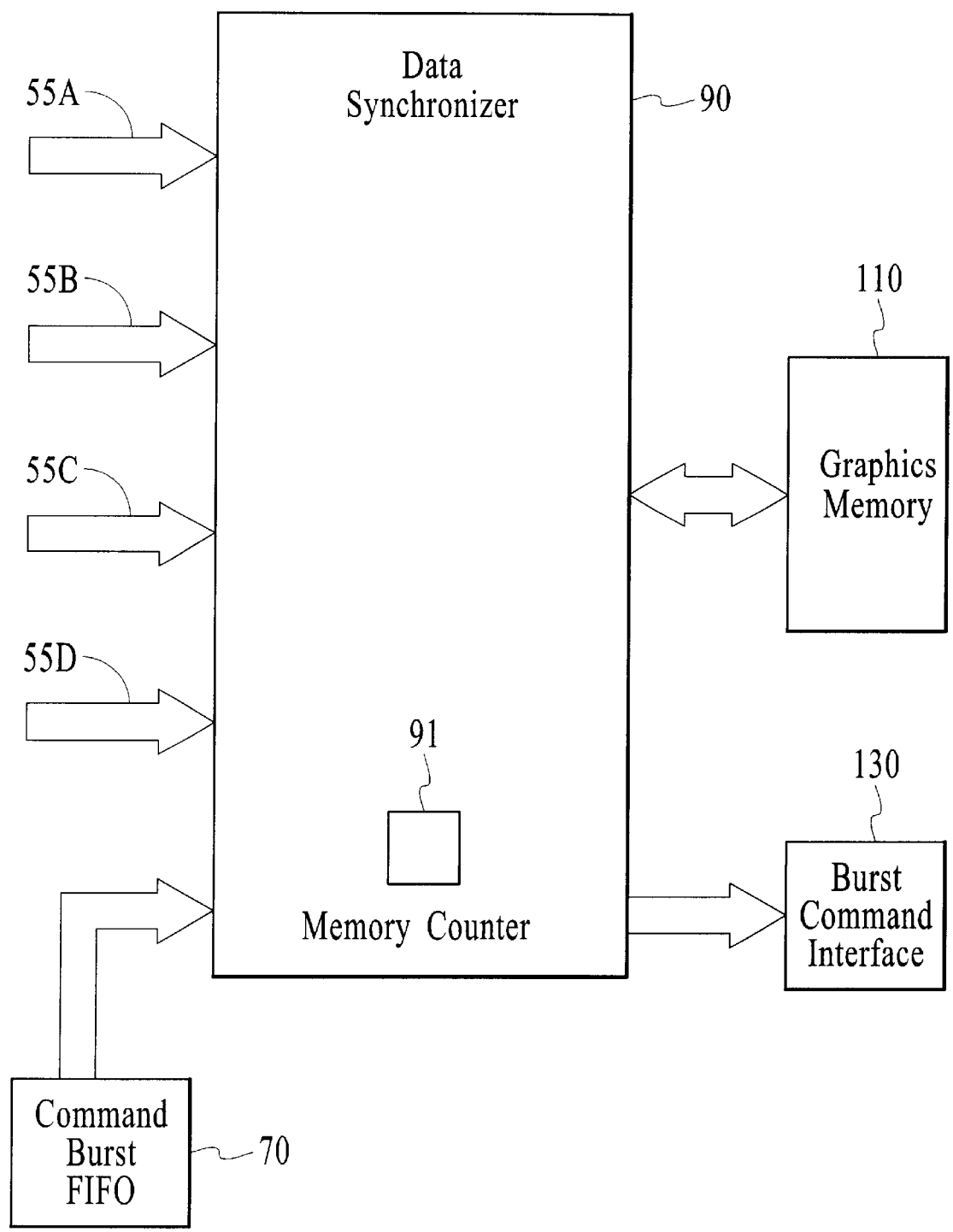
FIG. 12 illustrates a block diagram of an embodiment of the data synchronizer of FIG. 3.

FIG. 12 illustrates a block diagram of an embodiment of the data synchronizer 90. The data synchronizer 90 is connected the storing buffers 30, the command burst FIFO 70, and the graphics memory 110. The data synchronizer 90 transmits graphics data from either the storing buffers 30, the command burst FIFO 70, or the graphics memory 110 to the burst command interface 130. The data synchronizer 90 further contains a memory counter 91. The memory counter is updated, with a counter increased, for each transfer of graphics data from the command burst FIFO 70 to the graphics memory 110. The memory counter is also updated, with the counter decreased, for each transfer of graphics data from the graphics memory 110 to the data synchronizer 90. Through the use of the memory counter 91, the data synchronizer keeps track of the amount of graphics data in the graphics memory and thus the amount that needs to be retrieved from the graphics memory by the data synchronizer.

Similarly, as previously described in FIG. 8, he data synchronizer examines the burst FIFO status bit 71 to determine if data needs to be shifted out to the data synchronizer from the command burst FIFO. Furthermore, through the use of the tag arrays, the data synchronizer determines if data should be shifted out to the data synchronizer from the storage buffers. For instance, if a tag bit is set, data occupies a specific entry within a specific command storage buffer, as previously described and illustrated in FIG. 6. The tag bit, therefore, informs the data synchronizer that data is available in the storage buffers 30 for potential retrieval by the data synchronizer. Accordingly, the data synchronizer is able to determine if data needs to be retrieved from the graphics memory, the command burst FIFO, and the storage buffers by tracking, respectively, the memory counter, the burst FIFO status bit and the tag arrays.

Figure 13:
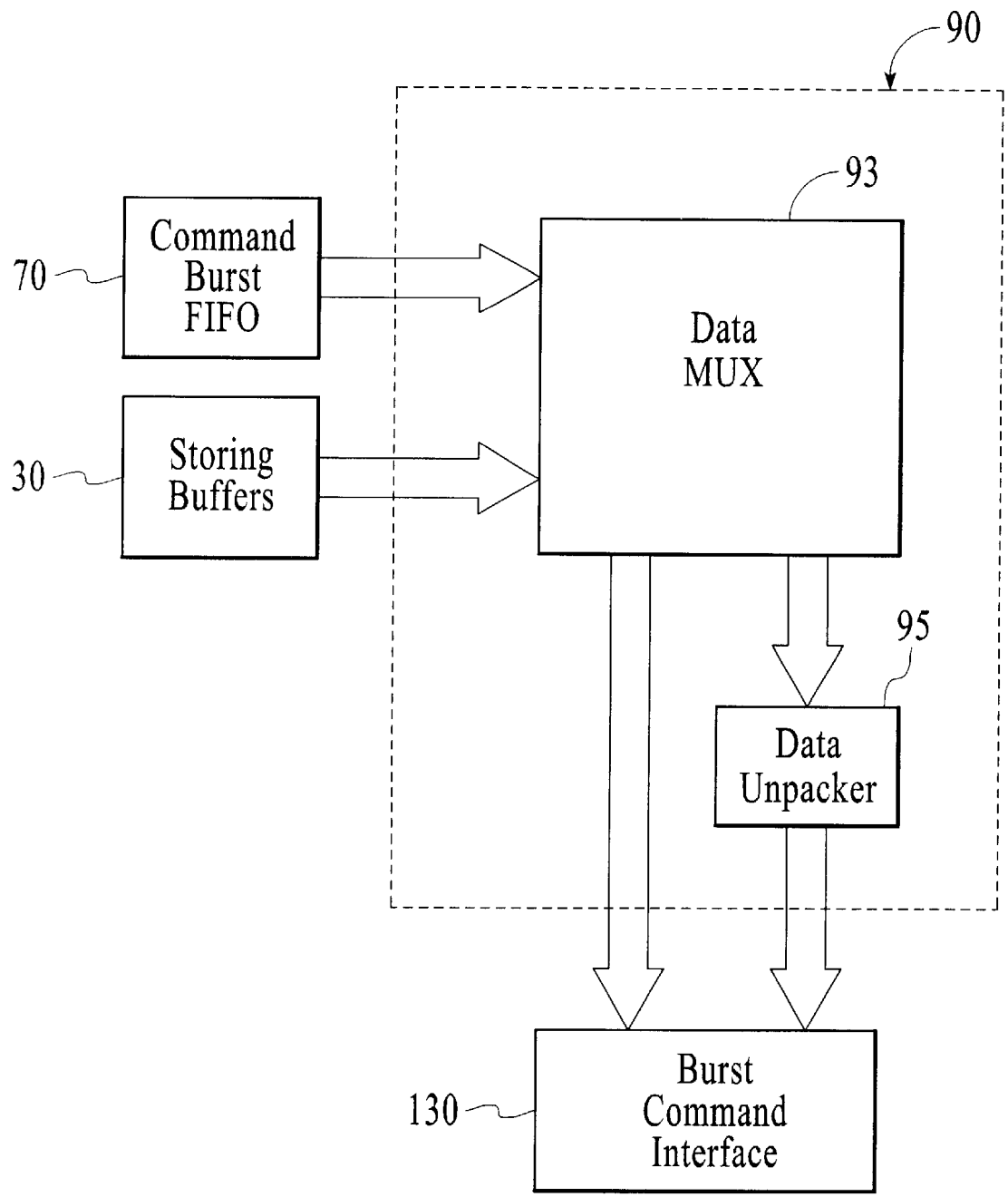
FIG. 13 illustrates a block diagram of another embodiment of the data synchronizer of FIG. 3.

FIG. 13 illustrates a block diagram or another embodiment of the data synchronizer 90. In the embodiment of FIG. 13, the data synchronizer 90 further contains a Data MUX 93. The Data MUX 93 acts as a 128 bit interface between the command burst FIFO and a 32 bit interface for each of the command storage buffers. The data from the command burst FIFO is sent to the data MUX. The 128 bit data sent from the command burst FIFO to the Data MUX is then transferred to a data unpacker 95. The data unpacker 95 breaks up the 128 bits of data into sequential blocks of 32 bits of data. The 32 bits of data are then transferred to the burst command interface.

When no data is left to send to the burst command interface from the command burst FIFO, then data from the storing buffers 30 is sent to the data MUX 93. If the data from the storing buffers is larger than 32 bits, the data is sent to the data unpacker 95. The data unpacker 95 breaks up the data from the data MUX 93 into sequential blocks of 32 bits of data to be transferred to the burst command interface. If the data from the storage buffers is equal to 32 bits of data then the Data MUX 93 can transmit the data directly to the burst command interface 130.

Figure 14:
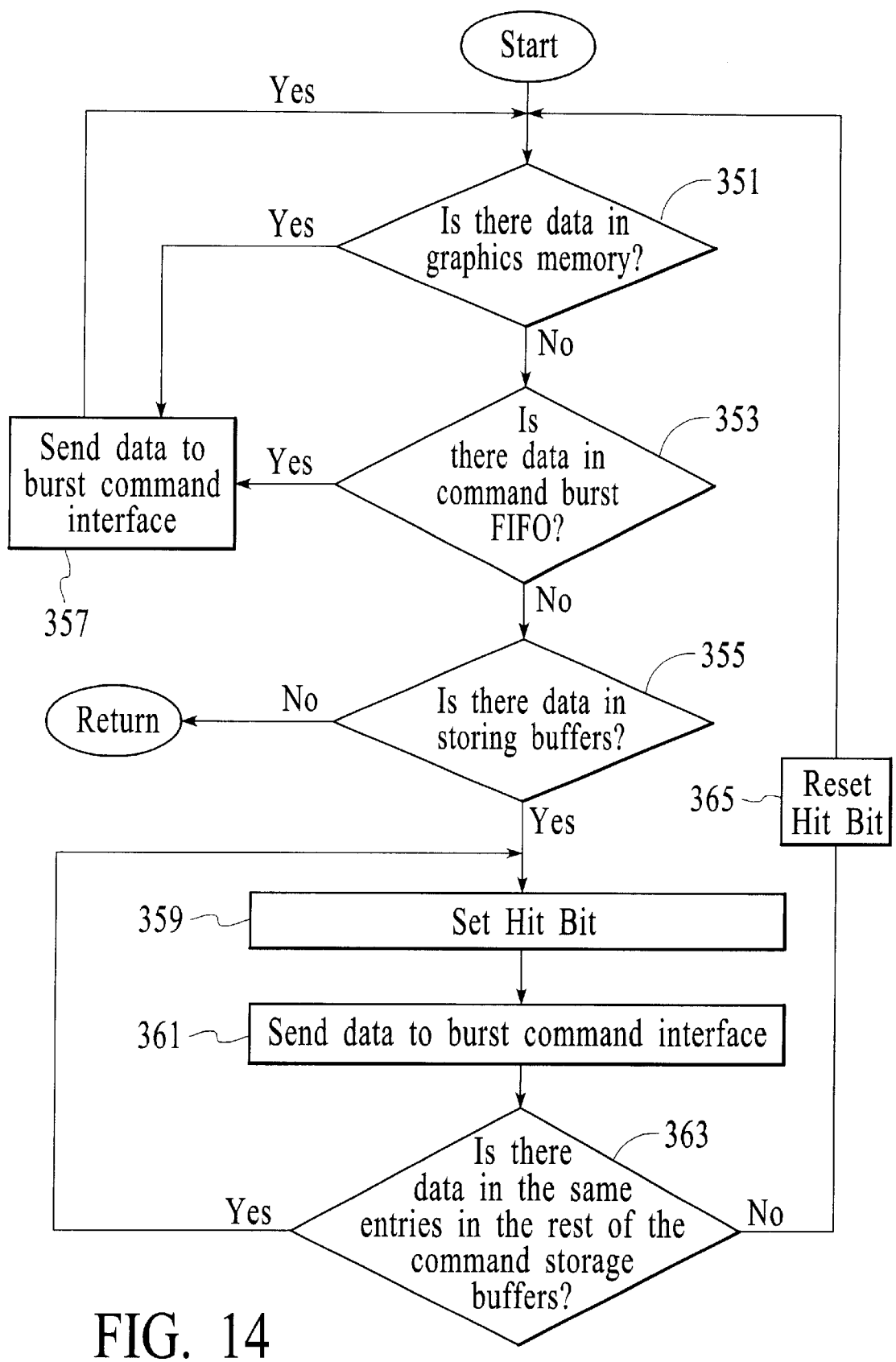
FIG. 14 illustrates a flow diagram of a process of providing data to the burst command interface from the data synchronizer.

FIG. 14 illustrates a flow diagram of a process the data synchronizer performs to shift data out to the burst command interface. In step 351, the process determines if graphics data is present in the graphics memory. If graphics data is present, then in step 357 the process sends the graphics data to the burst command interface and repeats step 351. If no graphics data is found in the graphics memory, the process in step 353 checks the command burst FIFO to determine if graphics data is present. If graphics data is present in the command burst FIFO, graphics data is sent to the burst command interface by the process in step 357, and the process repeats steps 351 and 353. If the process determines that no additional graphics data is present in the command burst FIFO, and that no data is present in the command burst FIFO after waiting a short latency period, then in step 355 the process determines if graphics data is present in the storing buffers. If in step 355 the process determines that no additional graphics data is present in the storing buffers, then the process returns. If graphics data is present in the storing buffers, the process sets the associated hit bit in the associated hit array in step 359 and sends the graphics data to the burst command interface in step 361. By setting the hit bit in the hit array, the decoder/sorter is prevented from writing graphics data to the same entry of the other command storage buffers. Furthermore, setting the hit bit prevents the storage buffers from transferring the graphics data to the command burst FIFO as 128 bits of packed data by transferring the graphics data in the same entry for each command storage buffers to the command burst FIFO. In step 363, the process checks the same entries within the rest of the command storage buffers for additional graphics data. If the process finds additional graphics data, then the process repeats steps 359 and 361. However, if the process does not find additional graphics data, then the process in step 365 resets the associated hit bits in the associated hit arrays and repeats steps 351, 353 and 355.

By resetting the same hit bit for all the hit arrays, the decoder/sorter is now allowed to write into the storage buffers without any restriction besides that imposed by the tag bits as previously described. Also, the storage buffers are allowed to transfer graphics data from the same entry of each of the command storage buffers to the command burst FIFO as 128 bits of graphics data.

Figure 15:
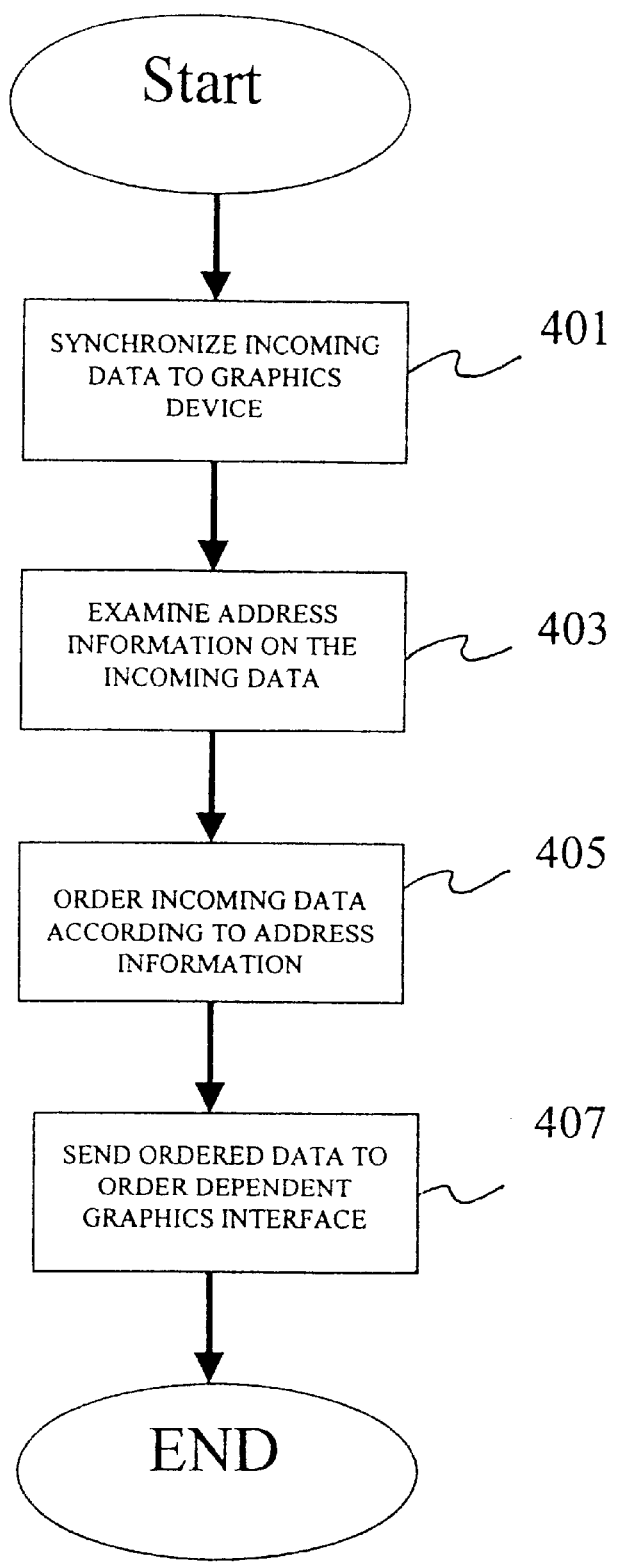
FIG. 15 illustrates a flow diagram of a process of reordering out of order data according to the present invention.

FIG. 15 illustrates a flow diagram of an embodiment of a method of reordering out of order bus transferred data. In step 401, the process receives incoming data from an outside data source through an input/output interface, such as a bus interface, and synchronizes the frequency of the bus interface to a graphics device. In step 403, the process examines the address information transferred with the incoming data. In step 405, the process orders the incoming data according to the address information examined in step 403. The process in step 405 uses different ways of storing information to properly order the incoming data and to flexibly accommodate different amounts of incoming data. In step 407, the process sends the ordered data to the order dependent graphics interface and then the process ends.

Accordingly, the present invention provides systems and methods for improved bus utilization through the use of encoded commands and received command and parameter reordering. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

What is claimed is:

1. A method of providing ordered data transmitted from a data source to a data destination over a bus, comprising the steps of:

writing items of data into sequentially ordered areas of a memory, the items of data having a predefined order in the data source, the sequentially ordered areas of memory being identifiable by addresses, each item of data being placed in an area having an associated address in the data source, the items of data further comprise commands and parameters;

transmitting the items of data and associated addresses from the data source to the data destination over the bus, the items of data being transmitted in an order other than the predefined order;

receiving the items of data and the associated addresses in the data source from the bus;

examining the associated address in the data source for each item of data received from the bus;

placing each item of data received from the bus in one of multiple sequentially arranged areas of a storing buffer, the storing buffer further comprises a plurality of storage buffers, each of the plurality of storage buffers having an associated read availability status array, each item being placed based on the associated address in the data source for each item, the placement of the items of data causing reordering of the received items of data; and reading an item of data from all of the storage buffers and placing the read items of data in a storage memory if all of the read availability status arrays indicate data available for reading, and reading an item from one of the storage buffers and providing the read item to a command interpreter, which performs the steps of examining the items of data and determining which parameters pertain to a command, if at least one but less than all of the read availability status arrays indicate data available for reading.

2. The method of providing ordered data of claim 1 wherein each parameter pertains to a command.

3. The method of providing ordered data of claim 2 further comprising examining the items of data to determine whether the items of data are commands or parameters.

4. The method of providing ordered data of claim 1 wherein the storing buffer has at least one associated read availability status array comprised of a plurality of read availability indicators, each of the multiple sequentially arranged areas of the storing buffer having a corresponding read availability indicator.

5. The method of providing ordered data of claim 4 further comprising setting the corresponding read availability indicator of the read availability status array to indicate data availability for reading when data is placed in the corresponding area of the storing buffer.

6. The method of providing ordered data of claim 4 further comprising setting the corresponding read availability indicator of the read availability status array to indicate data unavailability for reading when data is read from the corresponding area of the storing buffer.

7. The method of claim 1 wherein each of the storage buffers has an associated direct read status array comprised of a plurality of direct read status indicators, each of the multiple sequentially arranged areas of the storing buffer having a corresponding direct read status indicator, and the method further comprises setting the corresponding direct read status indicator to indicate a direct read if an item is read from a corresponding area of the storing buffer when less than all of the read arrays indicate data availability.

8. The method of claim 7 further comprising setting all of the direct read status indicators to indicate not a direct read if each of the direct read status arrays indicate a direct read.

9. The method of claim 7 wherein status of the read availability status arrays and the direct read status arrays is determined by examining the read availability status arrays and the direct read status arrays, and examination and setting of the read availability status arrays and the direct read status arrays is performed on an indicator by indicator basis.

10. A bus interface unit to a computer device, the bus interface unit being coupled to a bus with a weakly ordered interface providing information comprised of data items and associated addresses received from a data source, the bus interface unit comprising:

a plurality of storage buffers each having a plurality of slots for storing data items, the plurality of slots being identifiable by addresses;

a first router for routing the data items received from the bus to a particular one of the plurality of storage buffers based on a first part of the addresses in the data source associated with the data items; and a plurality of second routers for each of the storage buffers for routing the data items routed to the particular one of the storage buffers to one of the slots in the particular one of the storage buffers based on a second part of the addresses in the data source associated with the data items.

11. The bus interface unit of claim 10 further comprising means for providing data items stored in the plurality of slots to a command interpreter for determining if any of the data items corresponds to a command.

12. The bus interface unit of claim 10 wherein the plurality of storage buffers include means for indicating whether each of the plurality of slots contains data items not provided to a command interpreter.

13. The bus interface unit of claim 10 further comprising means for providing data items from one slot of each of the plurality of storage buffers to a temporary storage area, and means for providing data items stored in the temporary storage area to a command interpreter.

14. The bus interface unit of claim 13 wherein the plurality of storage buffers include means for indicating whether each of the plurality of slots contains data items provided to the command interpreter without the data items being first provided to the temporary storage area.

15. The bus interface unit of claim 10 further comprising a receive FIFO, with the first router routing data items received from the bus to one of the plurality of storage buffers by way of the receive FIFO.

16. The bus interface unit of claim 15 wherein data item is received by the bus interface unit at a bus clock rate and the bus interface unit operates at a computer device clock rate, the receive FIFO inputting data item at the bus clock rate and outputting data item at the computer device clock rate.

* * * * *